(12) United States Patent
Nakayama et al.

(10) Patent No.: US 12,504,101 B2
(45) Date of Patent: Dec. 23, 2025

(54) TUBE BODY INTERMEDIATE

(71) Applicants: Hitachi Astemo, Ltd., Ibaraki (JP); MURATA MACHINERY, LTD., Kyoto (JP)

(72) Inventors: Takahiro Nakayama, Ibaraki (JP); Kenichi Mori, Ibaraki (JP); Kazuki Ohta, Ibaraki (JP); Motohiro Tanigawa, Kyoto (JP); Tadashi Uozumi, Kyoto (JP)

(73) Assignees: Hitachi Astemo, Ltd., Ibaraki (JP); MURATA MACHINERY, LTD., Kyoto (JP)

( * ) Notice: Subject to any disclaimer, the term of this patent is extended or adjusted under 35 U.S.C. 154(b) by 454 days.

(21) Appl. No.: 17/884,215

(22) Filed: Aug. 9, 2022

(65) Prior Publication Data

US 2022/0381373 A1    Dec. 1, 2022

(51) Int. Cl.
*F16L 9/14*       (2006.01)
*B29C 70/30*      (2006.01)
*B29K 307/04*     (2006.01)
*F16L 9/12*       (2006.01)
*B29L 23/00*      (2006.01)

(52) U.S. Cl.
CPC .............. *F16L 9/14* (2013.01); *B29C 70/30* (2013.01); *F16L 9/12* (2013.01); *B29K 2307/04* (2013.01); *B29L 2023/22* (2013.01); *F16L 9/123* (2013.01)

(58) Field of Classification Search
CPC .................................................. F16L 11/00
USPC ................................ 138/123–126, 137, 141
See application file for complete search history.

(56) References Cited

U.S. PATENT DOCUMENTS

| | | | | |
|---|---|---|---|---|
| 3,491,799 A | * | 1/1970 | Foll .................... | B29C 61/0616 138/144 |
| 3,506,515 A | * | 4/1970 | Hornor ................. | C08G 18/00 156/173 |
| 4,153,747 A | * | 5/1979 | Young ................. | C09J 7/30 138/155 |
| 4,771,518 A | * | 9/1988 | LaPointe ............. | B64G 6/00 28/165 |

(Continued)

FOREIGN PATENT DOCUMENTS

| | | |
|---|---|---|
| CN | 104136201 A | 11/2014 |
| JP | S45-18031 Y1 | 7/1970 |

(Continued)

OTHER PUBLICATIONS

Japanese Office Action for the related Japanese Patent Application No. 2022-508017 dated Jan. 31, 2023.

(Continued)

*Primary Examiner* — David R Deal
(74) *Attorney, Agent, or Firm* — KENEALY VAIDYA LLP

(57) ABSTRACT

The tube body intermediate includes: a carbon fiber disposed with respect to an outer circumferential surface of a mandrel such that the carbon fiber extends in an axial direction of the mandrel in a manner of being wound by less than one turn; and a first fixing member wound with respect to an outer circumferential surface of the mandrel such that the first fixing member extends in the axial direction of the mandrel in a manner of being wound over the carbon fiber by one or more turns in a circumferential direction.

4 Claims, 12 Drawing Sheets

(56) References Cited

U.S. PATENT DOCUMENTS 8,047,237 B2 * 11/2011 Limas ................... B29C 70/086
138/123
2015/0034233 A1 2/2015 Hatta et al.

FOREIGN PATENT DOCUMENTS

| JP | S51-137769 A | 11/1976 |
| JP | H03-265738 A | 11/1991 |
| JP | H08-187797 A | 7/1996 |
| JP | H08-205650 A | 8/1996 |
| JP | 2013095112 A | 5/2013 |
| JP | 2015-145104 A | 8/2015 |
| WO | 2021/186734 A1 | 9/2021 |

OTHER PUBLICATIONS

Chinese Office Action for the related Chinese Patent Application No. 202080094729.3 dated Jun. 29, 2023.
International Search Report and Written Opinion of the International Search Report for PCT/JP2020/012536 dated Jun. 2, 2020.
Korean Office Action for related Korean patent application No. 10-2022-7031827 dated Feb. 11, 2025.

* cited by examiner

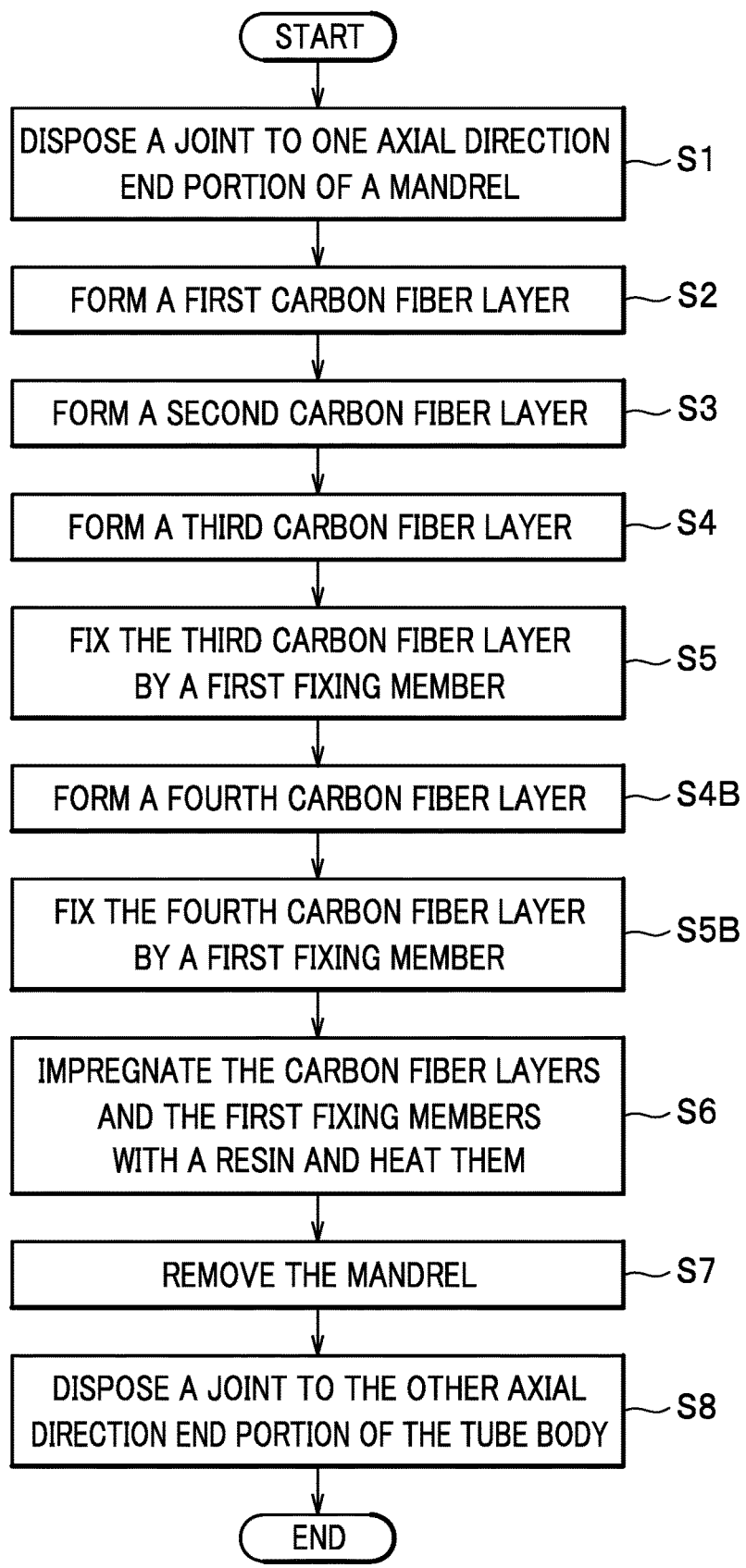

TUBE BODY INTERMEDIATE

CROSS-REFERENCE TO RELATED APPLICATIONS

This application is a PCT Bypass application and claims priority under 35 U.S.C. § 120 to PCT application no. PCT/JP2020/012536 filed on Mar. 19, 2020, the disclosure of which is hereby incorporated by reference in its entirety.

TECHNICAL FIELD

The present invention relates to an intermediate of a tube body which is, for example, used as a power transmission shaft of a vehicle and to a method of producing a tube body.

BACKGROUND ART

Power transmission shafts (propeller shafts) mounted on vehicles each include a tube body extending in the front-rear direction of the vehicle. The tube body transmits power generated by a power plant and decelerated by a transmission to a final reduction gear unit. There is known a tube body made of a fiber reinforced plastic and produced using a mandrel, as a tube body used for such a power transmission shaft (see Japanese Patent Publication No. H03-265738 A).

SUMMARY OF THE INVENTION

Problems to be Solved by the Invention

Known techniques for winding a material over a mandrel includes the filament winding technique, which involves winding a continuous fiber impregnated with a resin, and the sheet winding technique, which involves winding a prepreg (a sheet made by impregnating a fiber material with a resin). The filament winding technique is advantageous for low-cost production but has difficulty in aligning a fiber material along the axial direction of a mandrel, in other words, aligning a fiber material along the axial direction of the tube body. On the other hand, the sheet winding technique allows aligning a fiber material along the axial direction of a mandrel but is disadvantageous in terms of production cost.

Here, assume that L represents the axial direction length over which fibers are disposed over a mandrel, r represents the radius of the outer circumferential surface of the mandrel, and $\theta$ represents the orientation angle of the fibers with respect to the mandrel (see FIG. 1). When the orientation angle $\theta$ is small such that $\tan\theta < |2\pi r/L|$, the fiber fails to be wound around the mandrel by one or more turns, in which case gravity can cause the fibers to separate from the mandrel.

The present invention is made to resolve such a problem, and it is an object of the present invention to provide a tube body intermediate and a tube body production method with which it is possible to, while reducing the production cost, reduce displacement of a fiber body even when the orientation angle of the fiber body is small.

Means for Solving the Problems

To resolve the above-described problems, a tube body intermediate of the present invention includes: a fiber body disposed with respect to an outer circumferential surface of a mandrel so as to extend in an axial direction of the mandrel; and a first fixing member wound with respect to the outer circumferential surface of the mandrel such that the first fixing member is wound over the fiber body by one or more turns in a circumferential direction, along the axial direction of the mandrel.

Moreover, a tube body production method of the present invention includes: a disposing step of disposing a fiber body with respect to an outer circumferential surface of a mandrel so that the fiber body extends in an axial direction of the mandrel; a fixation step of winding a first fixing member with respect to the outer circumferential surface of the mandrel such that the first fixing member is wound over the fiber body by one or more turns in a circumferential direction, along the axial direction of the mandrel; and a molding step of molding a resin in a tubular shape on the outer circumferential surface of the mandrel so as to include the fiber body.

BRIEF DESCRIPTION OF THE DRAWINGS

FIG. 10 is a flowchart illustrating a tube body production method according to the second embodiment of the present invention.

MODES FOR CARRYING OUT THE INVENTION

An embodiment of the present invention will be described in detail with reference to the drawings, taking an exemplary case of producing a power transmission shaft (propeller shaft) of a vehicle as a tube body using a carbon fiber reinforced plastic. In the descriptions given below, the same elements are denoted by the same reference signs, and overlapping descriptions will be omitted. The drawings referenced in the description are depicted in a deformed manner for ease of understanding such that the dimensions of the members (e.g., shape or the like of the joints 22 and 23 illustrated in FIGS. 5 and 7) are not represented accurately.

First Embodiment

Figure 1:
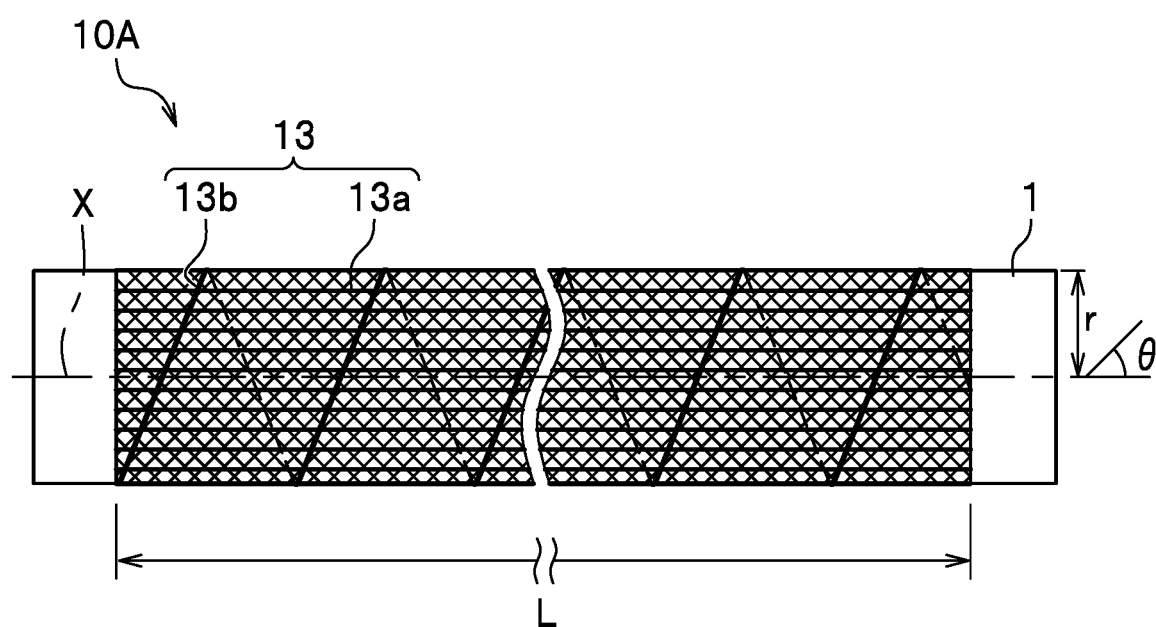
FIG. 1 is a diagram schematically illustrating a tube body intermediate according to a first embodiment of the present invention.
Figure 2:
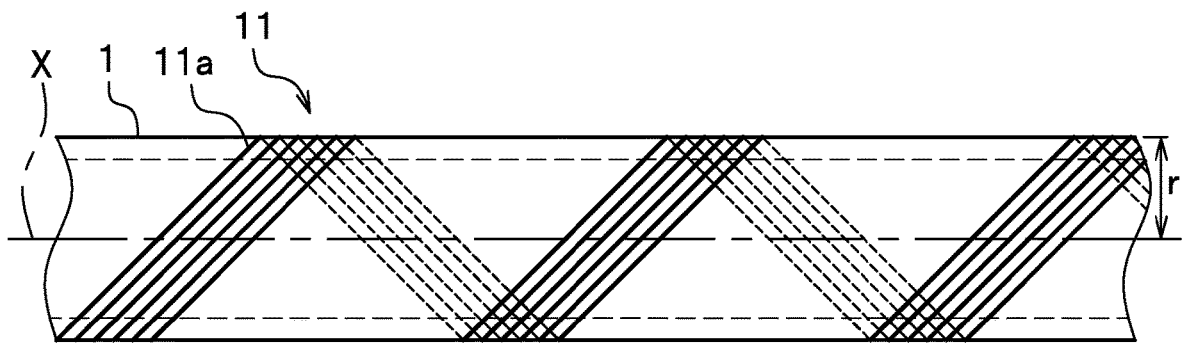
FIG. 2 is a diagram schematically illustrating a mandrel according to the first embodiment of the present invention and a first carbon fiber layer of the tube body intermediate according to the first embodiment of the present invention.

The tube body intermediate 10A illustrated in FIG. 1 is formed by disposing carbon fiber layers on the outer circumferential surface of a mandrel 1 (see FIG. 2). As illustrated in FIG. 2, the mandrel 1 is a metal member having a circular cylindrical tube shape.

<Tube Body Intermediate>

Figure 6:
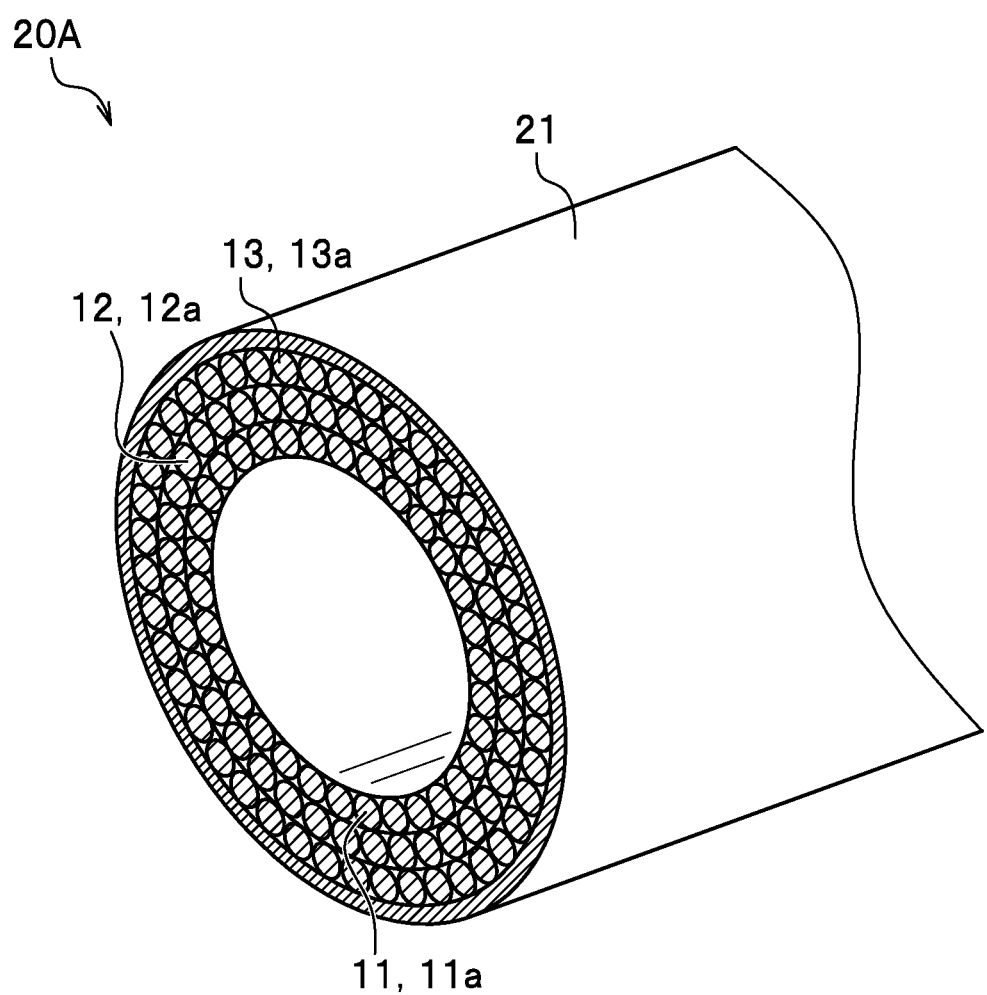
FIG. 6 is a diagram schematically illustrating a tube body produced using the tube body intermediate according to the first embodiment of the present invention.

As illustrated in FIG. 1, the tube body intermediate 10A according to the first embodiment of the present invention is a circular cylindrical tube member which has a plurality of carbon fiber layers stacked one above the other and which is formed in the middle of producing a tube body 20A (see FIG. 6) described later. The tube body intermediate 10A includes, in order from the radially inner side (from the mandrel 1 side), a first carbon fiber layer 11 (see FIG. 2), a second carbon fiber layer 12 (see FIG. 3), and a third carbon fiber layer 13 (see FIG. 4). The first carbon fiber layer 11, the second carbon fiber layer 12, and the third carbon fiber layer 13 constitute a reinforced carbon layer to be included in the resin 21 of the later-described tube body 20 to reinforce the resin 21. The tube body intermediate 10A further includes a first fixing member 13b as a member for fixing carbon fibers 13a in the third carbon fiber layer 13. Note that, FIGS. 2 to 4 only partially illustrate the carbon fiber layers 11, 12, and 13.

<<First Carbon Fiber Layer>>

As illustrated in FIG. 2, the first carbon fiber layer 11 is constituted by a plurality of carbon fibers 11a disposed with respect to the outer circumferential surface of the mandrel 1 so as to cover the mandrel 1. The carbon fibers 11a of the first carbon fiber layer 11 are disposed such that the carbon fibers 11a are wound by one or more turns so as to be inclined by 45 degrees with respect to the axial direction of the mandrel 1 and that the carbon fibers 11a extend helically with respect to the axial direction of the mandrel 1. In other words, the orientation angle θ of the carbon fibers 11a is 45 degrees with respect to the axis X of the mandrel 1.

<<Second Carbon Fiber Layer>>

Figure 3:
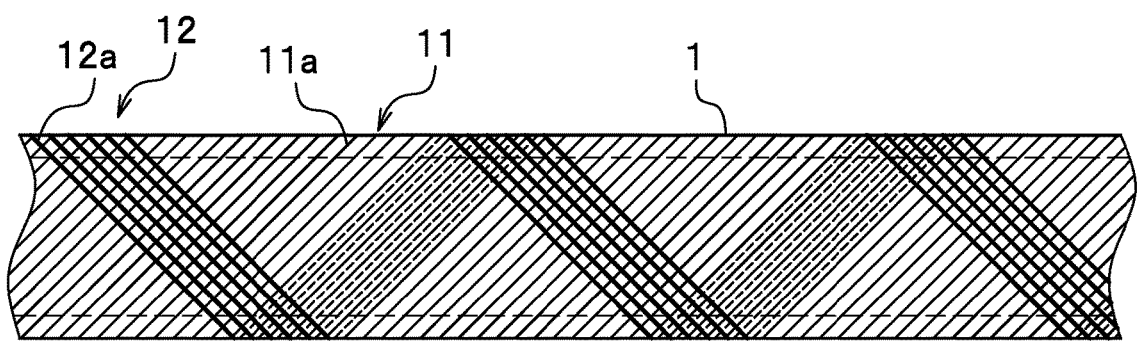
FIG. 3 is a diagram schematically illustrating a second carbon fiber layer of the tube body intermediate according to the first embodiment of the present invention.

As illustrated in FIG. 3, the second carbon fiber layer 12 is disposed on the radially outer side of the first carbon fiber layer 11 and is constituted by a plurality of carbon fibers 12a disposed so as to cover the first carbon fiber layer 11. The carbon fibers 12a of the second carbon fiber layer 12 are disposed such that the carbon fibers 12a are wound by one or more turns so as to be inclined by −45 degrees with respect to the axial direction of the mandrel 1 and that the carbon fibers 12a extend helically with respect to the axial direction of the mandrel 1. In other words, the orientation angle θ of the carbon fibers 12a is −45 degrees with respect to the axis X of the mandrel 1.

<<Third Carbon Fiber Layer>>

Figure 4:
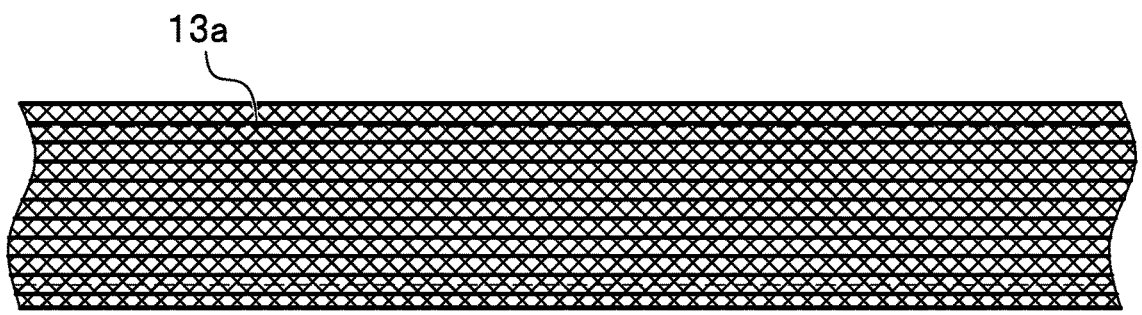
FIG. 4 is a diagram schematically illustrating a third carbon fiber layer of the tube body intermediate according to the first embodiment of the present invention.

As illustrated in FIG. 4, the third carbon fiber layer 13 is disposed on the radially outer side of the second carbon fiber layer 12 and is constituted by: a plurality of carbon fibers 13a disposed so as to cover the second carbon fiber layer 12; and the first fixing member 13b. The carbon fibers 13a of the third carbon fiber layer 13 are disposed to extend in parallel with the axial direction of the mandrel 1. In other words, the orientation angle θ of the carbon fibers 13a with respect to the axis X of the mandrel 1 is 0 degrees. The carbon fibers 13a has a length equal to the axial direction length L of a portion of the mandrel 1 on which portion the carbon fiber layers 11 to 13 are disposed. Note that the mandrel 1 has opposite end portions which are to be held by devices and thus on which the carbon fiber layers 11 to 14 are not disposed.

<<First Fixing Member>>

As illustrated in FIG. 1, the first fixing member 13b is a member configured to fix the carbon fibers 13a on the outer circumferential surface of the mandrel 1. The first fixing member 13b is a flexible resin member having, for example, a thread-like or belt-like shape. The first fixing member 13b may be formed of the same material as the later-described resin 21. The first fixing member 13b may be formed of a material that melts due to the heat(s) of a molding device (mold) 2 and/or of the resin 21 to mix into the resin 21. The first fixing member 13b is disposed such that the first fixing member 13b is wound by one or more turns so as to be inclined with respect to the axial direction of the mandrel 1 and that the first fixing member 13b extends helically with respect to the axial direction of the mandrel 1.

The first fixing member 13b as described above prevents the carbon fibers 13a, which are disposed on the outer circumferential surface of the mandrel 1 placed such that the axial direction thereof extends in the horizontal direction (i.e., which are disposed on the outer circumferential surface of the horizontally placed mandrel 1), from hanging down due to gravity. Specifically, the first fixing member 13b suitably prevents, of a portion of carbon fibers 13a located on a lower portion of the outer circumferential surface of the mandrel 1, an axial direction intermediate portion from hanging down due to gravity.

<Tube Body Production Method>

Figure 7:
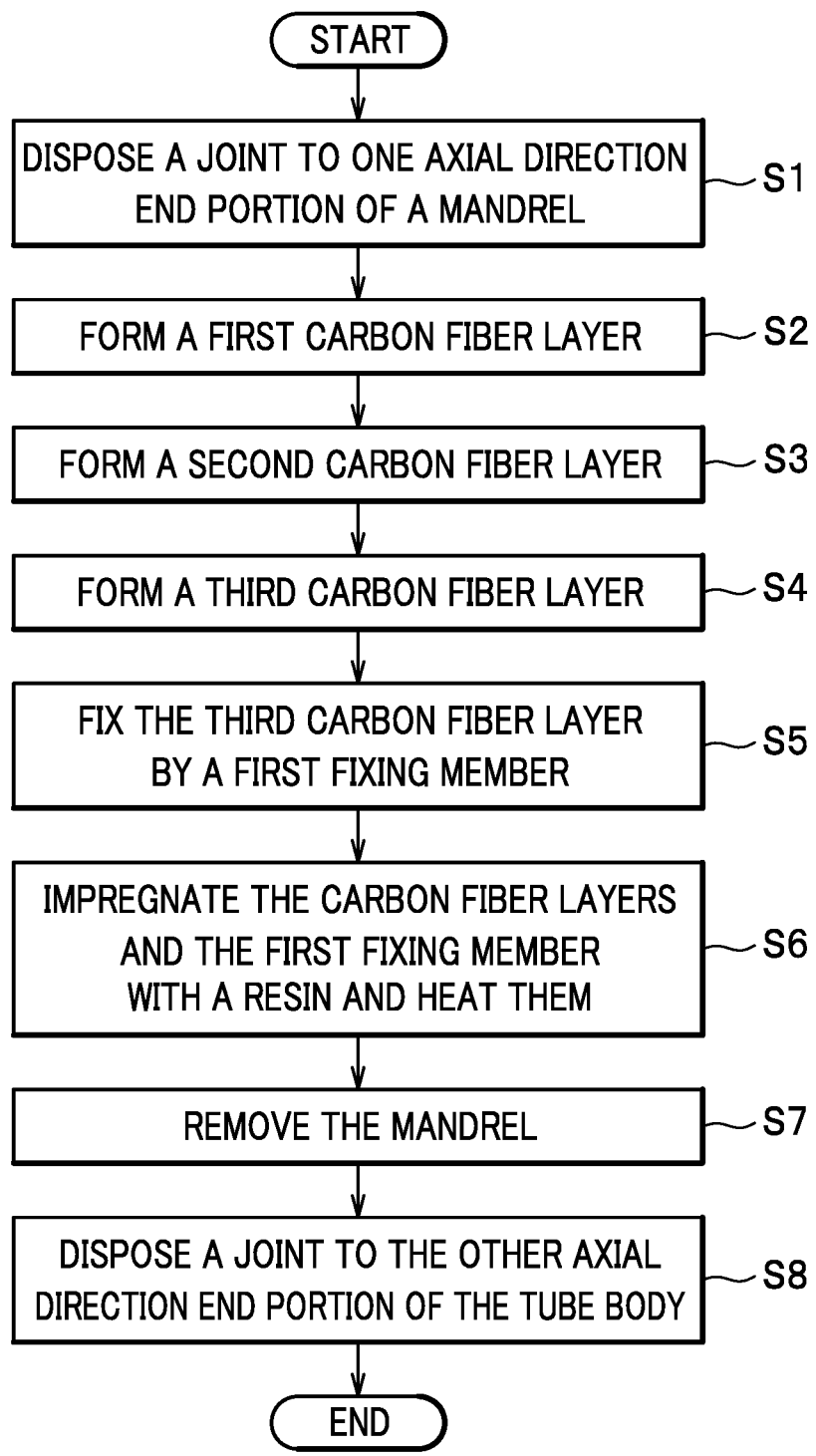
FIG. 7 is a flowchart illustrating a tube body production method according to the first embodiment of the present invention.
Figure 8:
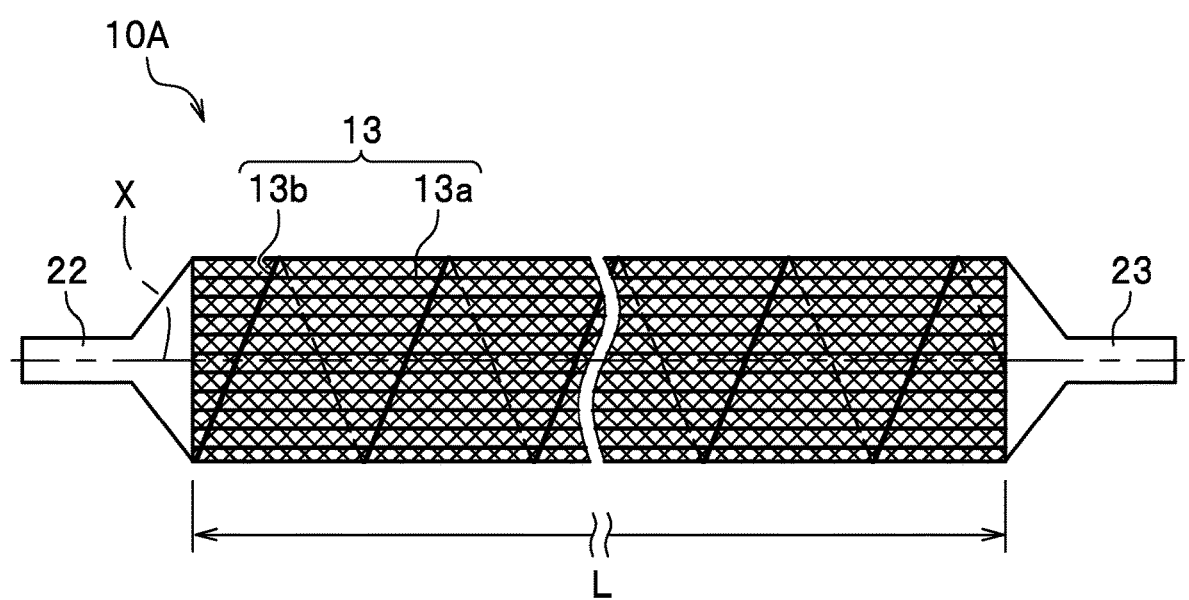
FIG. 8 is a diagram schematically illustrating an example of the tube body according to the first embodiment of the present invention.

Subsequently, a description will be given of a method of producing a tube body 20A (see FIG. 6) via the tube body intermediate 10A according to the first embodiment, using the flowchart illustrated in FIG. 7.

Firstly, a joint (stub yoke or stub shaft) 22 (see FIG. 5) is disposed (step S1: Joint installation step) to one axial direction end portion of the mandrel 1. Subsequently, as illustrated in FIG. 2, the first carbon fiber layer 11 is formed (step S2: First carbon fiber layer forming step) on the outer circumferential surface of the mandrel 1 by a not-illustrated device. Subsequently, as illustrated in FIG. 3, the second carbon fiber layer 12 is formed (step S3: Second carbon fiber layer forming step) on the outer circumferential surface of the first carbon fiber layer 11 by a not-illustrated device. Subsequently, as illustrated in FIG. 4, carbon fibers 13a of the third carbon fiber layer 13 are formed (step S4: Third carbon fiber layer forming step/Disposing step) on the outer circumferential surface of the second carbon fiber layer 12 by a not-illustrated device.

Subsequently, as illustrated in FIG. 1, by a not-illustrated device, the first fixing member 13b is disposed on the outer circumferential surface of the carbon fibers 13a of the third carbon fiber layer 13, thereby the carbon fibers 13a are fixed (step S5: Third carbon fiber layer forming step, Fixation step) with respect to the mandrel 1.

The above-described steps from the first carbon fiber forming step to the fixation step can be said as a tube body intermediate production method configured to produce the tube body intermediate 10A.

Figure 5:
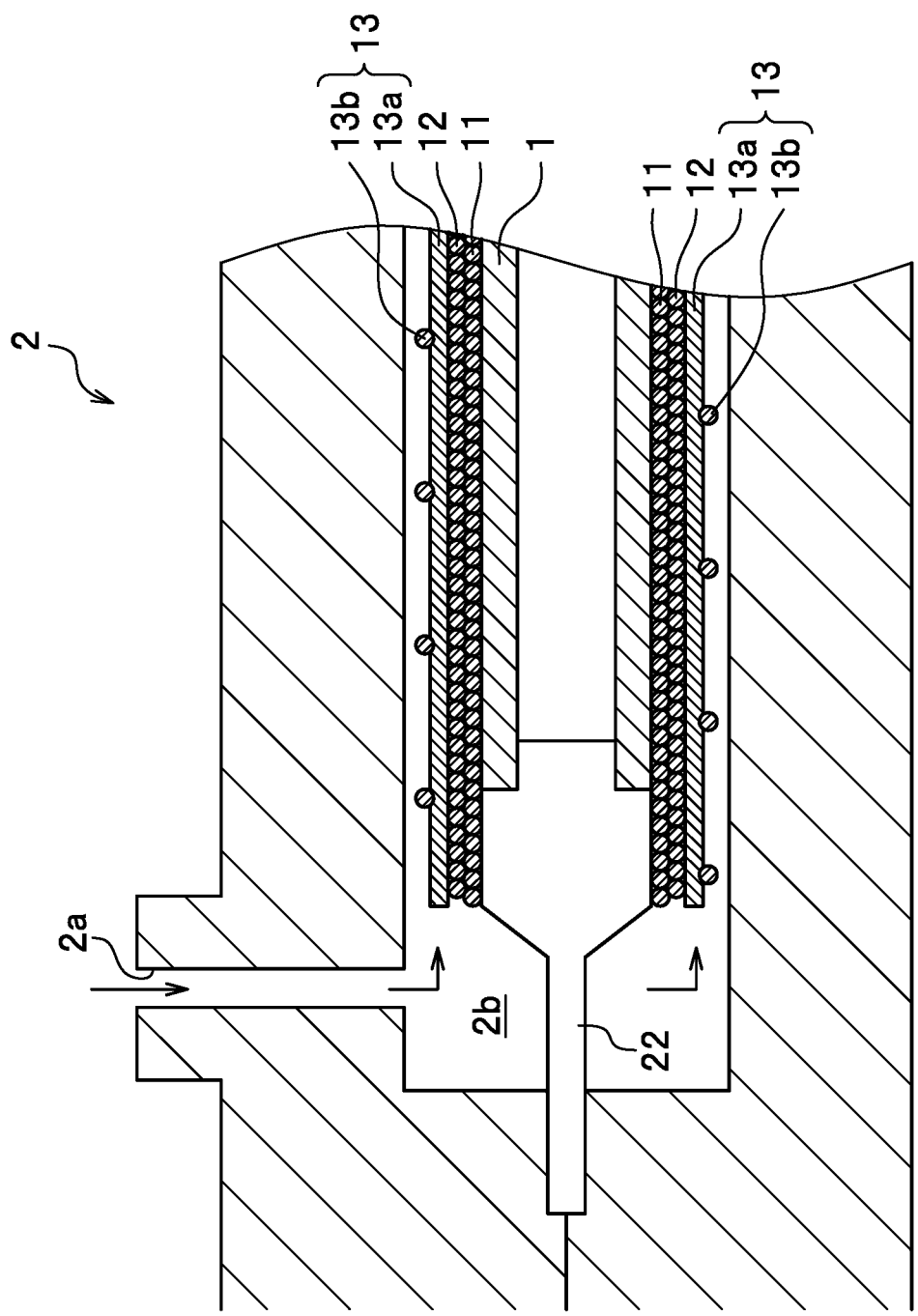
FIG. 5 is a diagram schematically illustrating a molding device for producing the tube body according to the first embodiment of the present invention.

Subsequently, as illustrated in FIG. 5, the first carbon fiber layer 11, the second carbon fiber layer 12, and the third carbon fiber layer 13 are impregnated with a resin 21 by a molding device (mold) 2. Then, heat is applied to the molding device 2 to form (step S6: Molding step) the tube body 20. The resin 21 is, for example, a thermosetting resin. In the case of the present embodiment, the mold of the molding device 2 is divided into plural parts. In the molding step, while applying heat to the tube body intermediate 10A, after a mold closing operation that closes the mold of the molding device 2, a mold clamping operation that applies pressure to the closed mold is performed to increase the pressure in the mold, thereby to facilitate curing of the resin 21. Note that, as the present embodiment is described as using a mold having a plurality of parts, the mold closing operation and the mold clamping operation are described as being performed. However, the mold clamping operation is not necessarily mandatory. In addition, when the mold is not divided into a plurality of parts, such mold closing operation and mold clamping operation are not necessarily mandatory. In the example illustrated in FIG. 5, the joint (stub yoke or stub shaft) 22 is disposed to the one axial direction end portion of the mandrel 1, and the tube body intermediate 10A extends to an outer circumferential surface of the joint 22. Moreover, in the molding device 2, on the egress side of a gate 2a, through which the resin 21 in a molten state is to be injected, a space (resin reservoir 2b) is formed. The resin 21 injected into the molding device 2 moves via the resin reservoir 2b in the axial direction of the mandrel 1. The resin 21 as described above interpenetrates into the first carbon fiber layer 11, the second carbon fiber layer 12, and the third carbon fiber layer 13. In a state where the resin 21 has interpenetrated into the carbon fiber layers 11 to 13, heat is applied to the molding device 2 and pressure is applied inside the molding device 2, thereby to form the tube body 20. In the molding step, the first fixing member 13b may melt due to the heat(s) of the molding device (mold) 2 and/or of the resin 21 and may mix into the resin 21.

Subsequently, the molded tube body 20A and the mandrel 1 are taken out from the molding device 2 and then the mandrel 1 is pulled out (step S7: Core removal step) from the tube body 20A. Subsequently, a joint (the other stub yoke or stub shaft) 23 is attached (step S8: Joint attachment step) to the other axial direction end portion of the mandrel 1.

The tube body intermediate 10A according to the first embodiment of the present invention includes: a fiber body (carbon fibers 13a) disposed with respect to the outer circumferential surface of the mandrel 1 so as to extend in the axial direction of the mandrel 1; and the first fixing member 13b wound with respect to outer circumferential surface of the mandrel 1 such that the first fixing member 13b is wound over the fiber body by one or more turns in the circumferential direction, along the axial direction of the mandrel 1.

The tube body production method according to the first embodiment of the present invention includes: a disposing step of disposing the fiber body (carbon fibers 13a) with respect to the outer circumferential surface of the mandrel 1 so that the fiber body extends in the axial direction of the mandrel 1; a fixation step of winding the first fixing member 13b, which is configured to fix the fiber body with respect to the outer circumferential surface of the mandrel 1, with respect to the outer circumferential surface of the mandrel 1 such that the first fixing member 13b is wound over the fiber body by one or more turns in the circumferential direction, along the axial direction of the mandrel 1; and a molding step of impregnating the fiber body with a resin 21 on the outer circumferential surface of the mandrel 1 and then heating the resin 21 to mold the resin 21.

Theses configurations make it possible to, while reducing the production cost, reduce displacement of the fibers even when the orientation angle θ of the fiber body is small.

Second Embodiment

Subsequently, a description will be given of a tube body intermediate and a tube body production method according to a second embodiment of the present invention, while focusing on differences from the first embodiment.

Figure 9:
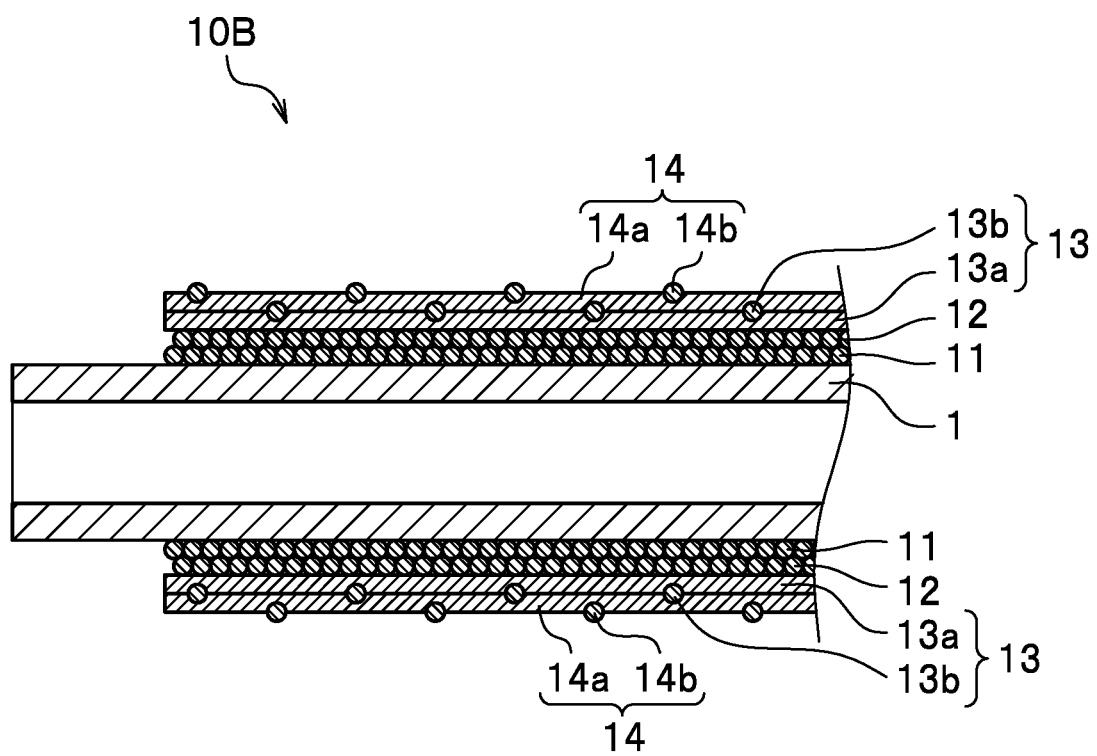
FIG. 9 is a cross-sectional view schematically illustrating a tube body intermediate according to a second embodiment of the present invention.

As illustrated in FIG. 9, a tube body intermediate 10B according to the second embodiment further includes a fourth carbon fiber layer 14 disposed on the radially outer side of the third carbon fiber layer 13.

<<Fourth Carbon Fiber Layer>>

The fourth carbon fiber layer 14 is disposed on the radially outer side of the third carbon fiber layer 13 and is constituted by: a plurality of carbon fibers 14a disposed so as to cover the third carbon fiber layer 13; and a first fixing member 14b. The carbon fibers 14a of the fourth carbon fiber layer 14 are disposed to extend in parallel with the axial direction of the mandrel 1. In other words, the orientation angle θ of the carbon fibers 14a with respect to the axis X of the mandrel 1 is 0 degrees. The carbon fibers 14a has a length equal to the axial direction length L of a portion of the mandrel 1 on which portion the carbon fiber layers 11 to 14 are disposed.

<<First Fixing Member>>

The first fixing member 14b is a member configured to fix the carbon fibers 14a on the outer circumferential surface of the mandrel 1. The first fixing member 14b is a flexible resin member having, for example, a thread-like or belt-like shape. The first fixing member 14b may be formed of the same material as the later-described resin 21. The first fixing member 14b may be formed of a material that melts due to the heat(s) of a molding device (mold) 2 and/or of the resin 21 to mix into the resin 21. The first fixing member 14b is disposed such that the first fixing member 14b is wound by one or more turns so as to be inclined with respect to the axial direction of the mandrel 1 and that the first fixing member 14b extends helically with respect to the axial direction of the mandrel 1. The first fixing member 14b is disposed with respect to the first fixing member 13b at a different phase in the axial direction of the mandrel 1 and in parallel with each other. In other words, the first fixing member 14b and the first fixing member 13b are disposed so as not to overlap with each other in the radial direction of the mandrel 1.

The first fixing member 14b as described above prevents the carbon fibers 14a, which are disposed on the outer circumferential surface of the mandrel 1 placed such that the axial direction thereof extends in the horizontal direction (i.e., which are disposed on the outer circumferential surface of the horizontally placed mandrel 1), from hanging down due to gravity. Specifically, the first fixing member 14b suitably prevents, of a portion of carbon fibers 14a located in a lower portion of the outer circumferential surface of the mandrel 1, an axial direction intermediate portion from hanging down due to gravity.

<Tube Body Production Method>

Figure 12:
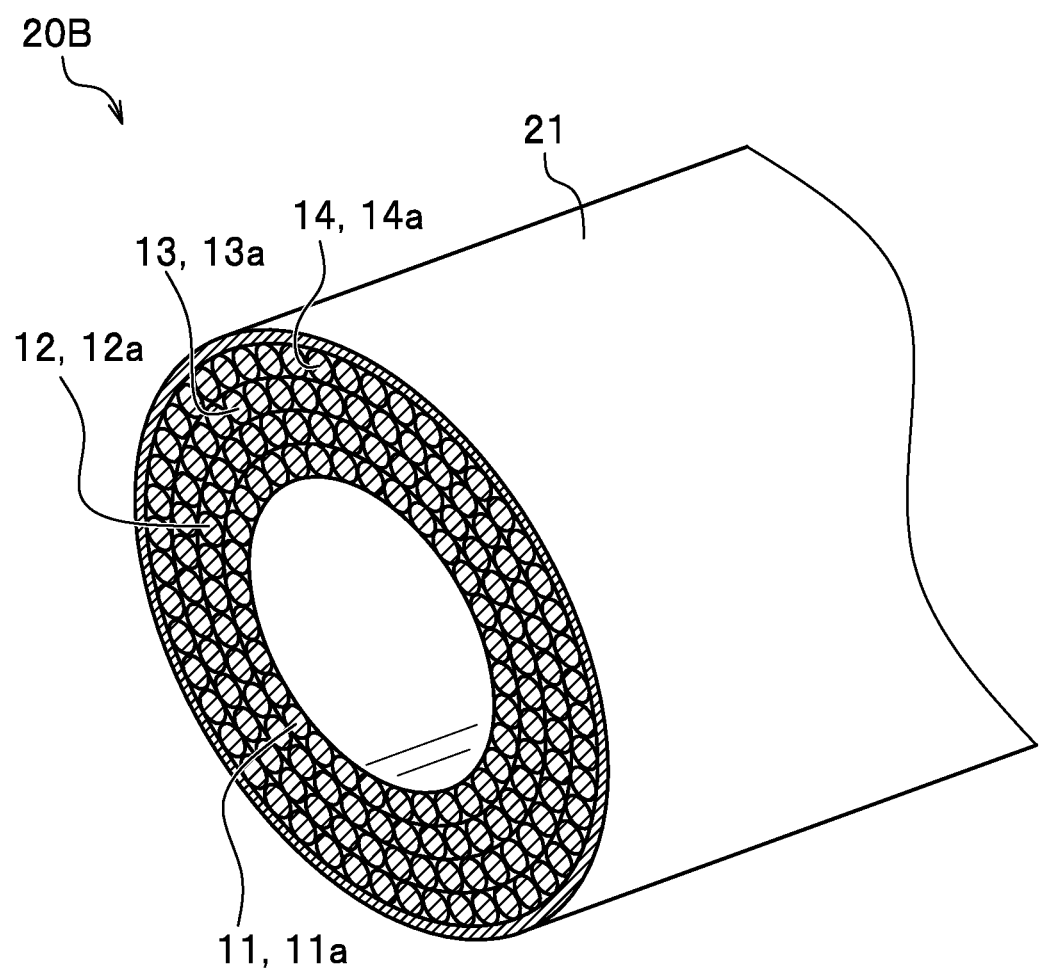
FIG. 12 is a diagram schematically illustrating a tube body produced using the tube body intermediate according to the second embodiment of the present invention.

Subsequently, a description will be given of a method of producing a tube body 20B (see FIG. 12) via the tube body intermediate 10B according to the second embodiment, using the flowchart illustrated in FIG. 10.

Figure 11A:
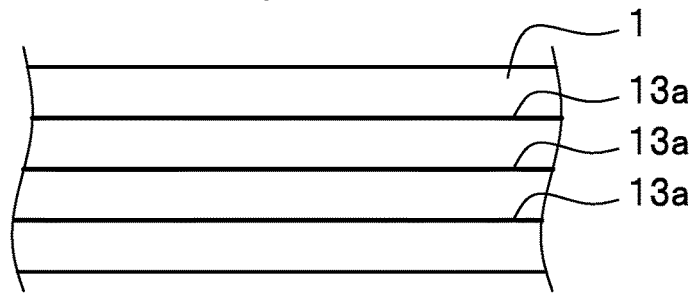
FIGS. 11A to 11D is explanatory diagrams schematically illustrating the tube body intermediate production method according to the second embodiment of the present invention.

In this production method, as illustrated in FIG. 11A, the carbon fibers 13a of the third carbon fiber layer 13 is formed (step S4: Third carbon fiber layer forming step/Disposing step) on the outer circumferential surface of the second carbon fiber layer 12 (see FIG. 7) by a not-illustrated device.

Figure 11B:
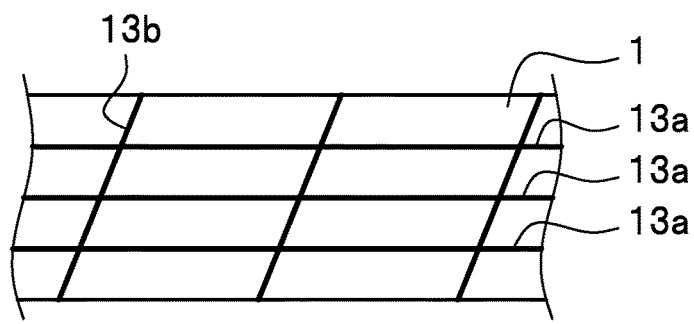

Subsequently, as illustrated in FIG. 11B, by a not-illustrated device, the first fixing member 13b is disposed on the outer circumferential surface of the carbon fibers 13a of the third carbon fiber layer 13, thereby the carbon fibers 13a are fixed (step S5: Third carbon fiber layer forming step; Fixation step) with respect to the mandrel 1.

Figure 11C:
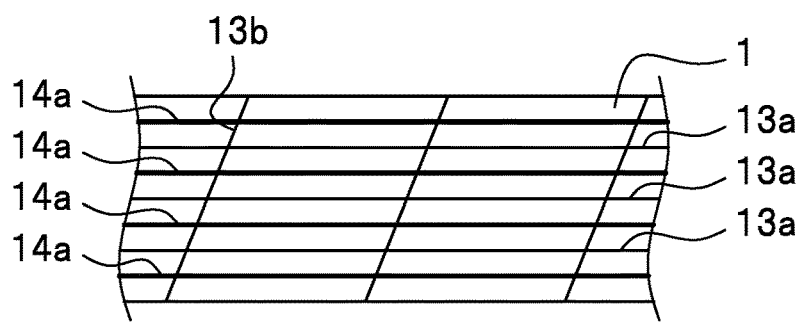

Subsequently, as illustrated in FIG. 11C, carbon fibers 14a of the fourth carbon fiber layer 14 are formed (step S4B: Fourth carbon fiber layer forming step/Disposing step) on the outer circumferential surface of the third carbon fiber layer 13 by a not-illustrated device.

Figure 11D:
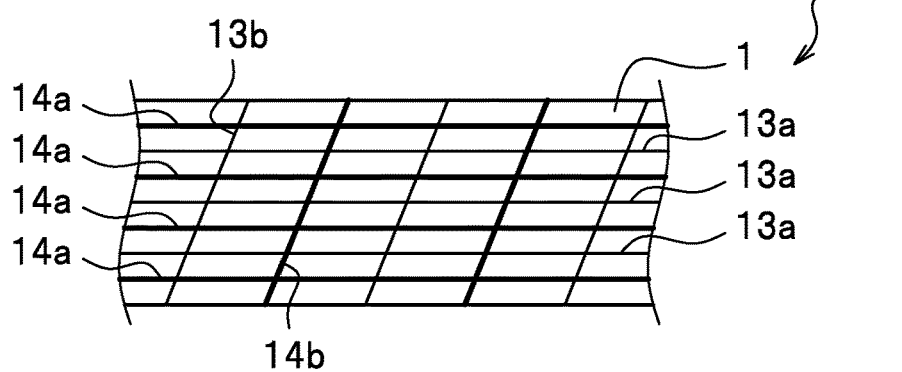

Subsequently, as illustrated in FIG. 11D, by a not-illustrated device, the first fixing member 14b is disposed on the outer circumferential surface of the carbon fibers 14a of the fourth carbon fiber layer 14, thereby the carbon fibers 14a are fixed (step S5B: Fourth carbon fiber layer forming step, Fixation step) with respect to the mandrel 1.

Note that in the example illustrated in FIG. 9, the carbon fibers 13a of the carbon fiber layer 13 and the carbon fibers 14a of the carbon fiber layer 14 are each densely arranged in the circumferential direction and the carbon fibers 14a, located on the outer side, are disposed in an overlapping manner on the radially outer side of the carbon fiber layer 13a and the first fixing member 13b, located on the inner side. In contrast, in the example illustrated in FIGS. 11A to 11D, the carbon fibers 13a of the third carbon fiber layer 13 are disposed at intervals in the circumferential direction and the carbon fibers 14a of the fourth carbon fiber layer 14 are respectively disposed in the intervals of the carbon fibers 13. Even in this structure, the carbon fibers 14a of the fourth carbon fiber layer 14 are disposed on the radially outer side of the first fixing member 13b of the third carbon fiber layer 13 in an overlapping manner. In this case, in comparison to a case where the carbon fibers 13a and carbon fibers 14a are fixed only with the first fixing member 14b (a case where the first fixing member 13b is omitted), the number of the carbon fibers 13a to be fixed by the first fixing member 13b and the number of the carbon fibers 14a to be fixed by the first fixing member 14b can be reduced, leading to improvement in the degree of freedom in the design of the first fixing members 13b, 14b.

The tube body intermediate 10B according to the second embodiment of the present invention includes a plurality of fiber layers each including the fiber body and the first fixing member. The plurality of fiber layers (carbon fibers 13a and carbon fibers 14a) are disposed in a manner of being stacked in the radial direction of the mandrel 1. The first fixing member 13b of the fiber layer 13, arranged as a lower layer, and the fiber body (carbon fibers 14a) of the fiber layer 14, arranged as an upper layer located on top of the lower layer, are at least stacked in the radial direction. The first fixing member 13b and the first fixing member 14b respectively included in the plurality of fiber layers are disposed at different phases in the axial direction of the mandrel (and in parallel with each other (with the same orientation angle)). In other words, the first fixing member 14b and the first fixing member 13b are disposed so as not to overlap with each other in the radial direction of the mandrel 1.

The tube body production method according to the second embodiment of the present invention further includes repeating the disposing step and the fixation step for a plurality of times before the molding step, thereby to form a plurality of fiber layers each including the fiber body and the first fixing member in a manner of being stacked in the radial direction of the mandrel 1. The first fixing member 13b of a lower one of the plurality of fiber layers and the fiber body (carbon fibers 14a) of an upper one of the plurality of fiber layers, located on top of the lower one, are at least stacked in the radial direction. In the repeating the fixation step for the plurality of times, the first fixing members 13b, 14b respectively included in the plurality of fiber layers are disposed at different phases in the axial direction of the mandrel 1.

Theses configurations make it possible to reduce displacement of the fiber body even when the orientation angle θ of the fiber body is small. Moreover, in comparison to a case where the first fixing members 13b and 14b are disposed at the same phase such that the first fixing member 13b and 14b overlap each other in the radial direction, these configurations make it possible to reduce the thickness of the tube body intermediate 10B and prevent a stress from being concentrated locally.

Third Embodiment

Subsequently, a description will be given of a tube body intermediate and a tube body production method according to a third embodiment of the present invention, while focusing on differences from the second embodiment.

Figure 13:
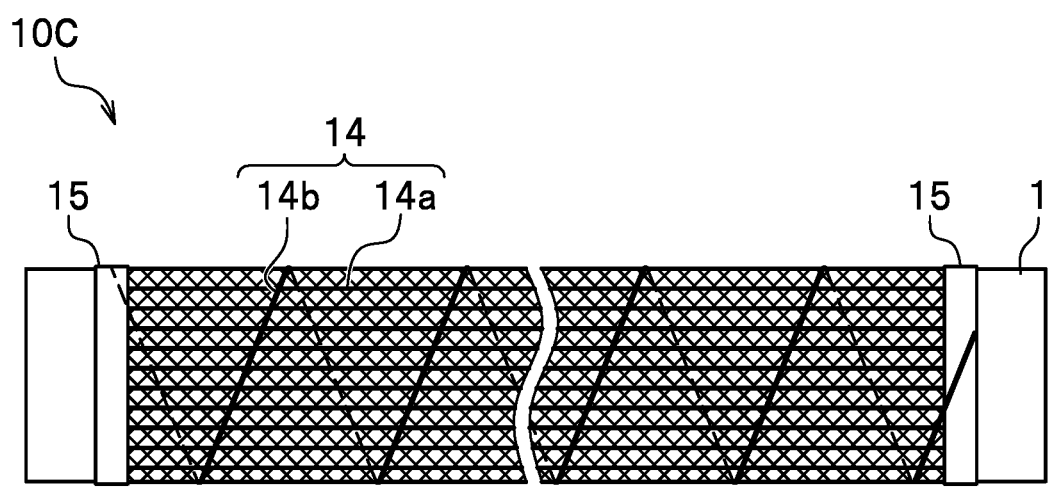
FIG. 13 is a diagram schematically illustrating a tube body intermediate according to a third embodiment of the present invention.

As illustrated in FIG. 13, a tube body intermediate 10C according to the third embodiment of the present invention includes a pair of second fixing members 15, 15 as members for fixing the third carbon fiber layer 13.

<<Second Fixing Member>>

The second fixing members 15 are members for fixing end portions of the third carbon fiber layer 13 to the outer circumferential surfaces of the axial direction end portions of the mandrel 1. The second fixing members 15 are each a belt-like flexible resin member having an adhesive part on one surface side (on the radially inner surface side). The second fixing members 15 are each wound in an annular shape. The second fixing members 15 may each be formed of the same material as the resin 21 or may each be formed of a material that melts due to the heat(s) of a molding device (mold) 2 and/or of the resin 21 to mix into the resin 21, like the first fixing member 14b.

<Tube Body Production Method>

Figure 14:
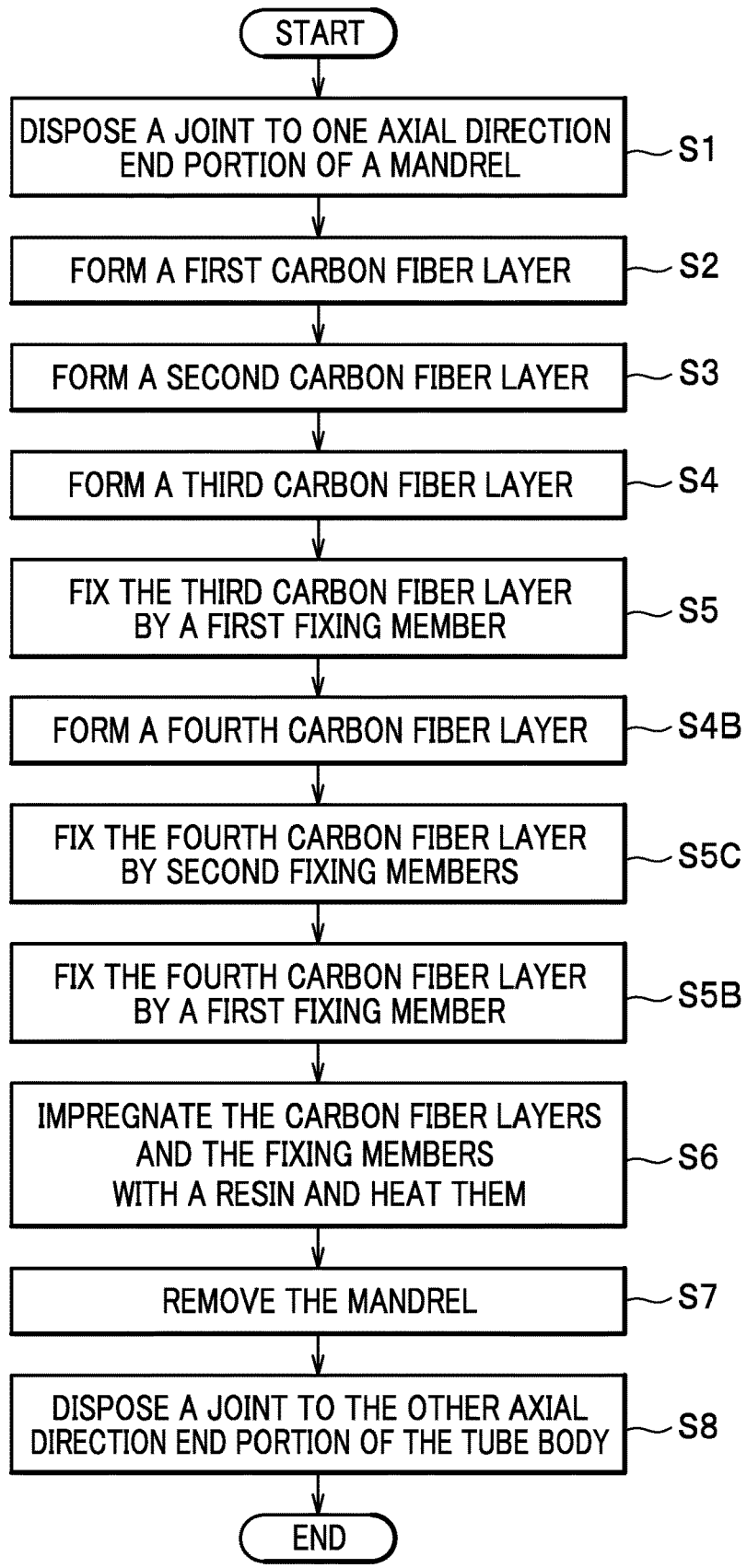
FIG. 14 is a flowchart illustrating a tube body production method according to the third embodiment of the present invention.

Subsequently, a description will be given of a method of producing a tube body via the tube body intermediate 10C according to the third embodiment, using the flowchart illustrated in FIG. 14.

Between the fourth carbon fiber layer forming step (step S4B) and the molding step (step S6), the second fixing members 15,15 are disposed on the outer circumferential surface of the opposite end portions of the fourth carbon fiber layer 14 by a not-illustrated device, so that the opposite end portions of the third carbon fiber layer 13 and the opposite end portions of the fourth carbon fiber layer 14 are fixed (step SSC, opposite end portions fixing step) with respect to the mandrel 1. The fixation by the second fixing members 15, 15 is preferably performed before the fixation (step S5B) by the first fixing members 14b, 14b. Moreover, the fixation by the second fixing members 15,15 may be performed between the third carbon fiber layer forming step (step S4) and the fourth carbon fiber layer forming step (step S4B).

The tube body intermediate 10C according to the third embodiment of the present invention includes the second fixing members 15 that fix the opposite end portions of the fiber body with respect to the outer circumferential surface of the mandrel 1.

According to the tube body production method according to the third embodiment of the present invention, in the fixation step, the opposite end portions of the fiber body is fixed with respect to the outer circumferential surface of the mandrel 1 by the second fixing members 15.

Theses configurations make it possible to, while reducing the production cost, suitably reduce displacement of the fiber body even when the orientation angle θ of the fiber body is small.

Although certain embodiments of the present invention have been described above, it is to be understood that the present invention is not limited only to the above-described embodiments and the embodiments of the present invention can be modified as appropriate within the range not departing from the gist of the invention. For example, the first carbon fiber layer 11 and the second carbon fiber layer 12 may be omitted and the third carbon fiber layer 13 may be disposed directly on the outer surface of the mandrel 1. Moreover, the orientation angle of the carbon fibers 13a of the third carbon fiber layer 13 and the orientation angle of the carbon fibers 14a of the fourth carbon fiber layer 14 are not limited to 0 degrees (not limited to being in parallel to the axial direction of the mandrel 1), but may be an angle such that the carbon fibers 13a and carbon fibers 14a are wound by less than one turn with respect to the mandrel 1. In other words, the present invention is preferably applied when the orientation angle θ of the carbon fibers 13a satisfies $\tan θ < |2πr/L|$. Moreover, the fiber bodies used in the tube body intermediates 10A to 10C are not limited to the carbon fibers 11a to 14a and may be other materials capable of reinforcing the tube body 20. Moreover, in the first embodiment, a plurality of the first fixing members 13b may be disposed at different phases in the axial direction of the mandrel 1 and in parallel with one another. Moreover, in the second embodiment, a plurality of the first fixing members 13b and a plurality of the first fixing members 14b may be disposed at different phases in the axial direction of the mandrel 1 and in parallel with one another.

What is claimed is:

1. A tube body intermediate comprising:
   a fiber body disposed with respect to an outer circumferential surface of a mandrel so as to extend in an axial direction of the mandrel; and
   a first fixing member wound with respect to the outer circumferential surface of the mandrel such that the first fixing member is wound over the fiber body by one or more turns in a circumferential direction, along the axial direction of the mandrel,
   wherein a fiber layer is comprised of the fiber body and the first fixing member,
   wherein the tube body intermediate comprises a plurality of fiber layers, including the fiber layer, each comprising:
   a respective fiber body disposed with respect to the outer circumferential surface of the mandrel so as to extend in the axial direction of the mandrel; and
   a respective first fixing member wound with respect to the outer circumferential surface of the mandrel such that the respective first fixing member is wound over the respective fiber body by one or more turns in the circumferential direction, along the axial direction of the mandrel,
   wherein the plurality of fiber layers are disposed in a manner of being stacked in a radial direction of the mandrel,
   wherein the respective first fixing member of a lower one of the plurality of fiber layers and the respective fiber body of an upper one of the plurality of fiber layers, located on top of the lower one, are at least stacked in the radial direction, and
   wherein the first fixing members of the plurality of fiber layers are disposed at different phases in the axial direction of the mandrel.

2. The tube body intermediate according to claim 1, further comprising a second fixing member fixing opposite end portions of the fiber body of one of the plurality of fiber layers with respect to the outer circumferential surface of the mandrel.

3. The tube body intermediate according to claim 1,
   wherein the first fixing members of the plurality of fiber layers are disposed at different phases in the axial direction of the mandrel so as not to overlap with one another in the radial direction of the mandrel.

4. A tube body intermediate comprising:
   a fiber body disposed with respect to an outer circumferential surface of a mandrel so as to extend in an axial direction of the mandrel;
   a first fixing member wound with respect to the outer circumferential surface of the mandrel such that the first fixing member is wound over the fiber body by one or more turns in a circumferential direction, along the axial direction of the mandrel; and
   a second fixing member fixing opposite end portions of the fiber body with respect to the outer circumferential surface of the mandrel.

* * * * *